(12) United States Patent
Kim et al.

(10) Patent No.: US 11,347,057 B2
(45) Date of Patent: May 31, 2022

(54) IMAGE DISPLAY DEVICE AND METHOD OF DISPLAYING IMAGE USING MULTIPLEX HOLOGRAPHIC OPTICAL ELEMENT

(71) Applicant: SAMSUNG ELECTRONICS CO., LTD., Suwon-si (KR)

(72) Inventors: Sunil Kim, Seoul (KR); Bongsu Shin, Seoul (KR); Wontaek Seo, Yongin (KR); Changkun Lee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 478 days.

(21) Appl. No.: 16/283,979

(22) Filed: Feb. 25, 2019

(65) Prior Publication Data

US 2020/0073124 A1 Mar. 5, 2020

(30) Foreign Application Priority Data

Sep. 5, 2018 (KR) .......................... 10-2018-0106045

(51) Int. Cl.
*G02B 27/01* (2006.01)
*G02B 5/32* (2006.01)

(52) U.S. Cl.
CPC .......... *G02B 27/0172* (2013.01); *G02B 5/32* (2013.01); *G02B 2027/0174* (2013.01); *G02B 2027/0178* (2013.01)

(58) Field of Classification Search
CPC .... G02B 2027/0132; G02B 2027/0136; G02B 2027/0172; G02B 2027/0174; G02B 2027/0178; G02B 5/32; G02B 27/0101; G02B 27/0172; G02B 27/0068; G02B 27/0103; G02B 27/0081; G02B 26/0808; G02B 27/0174; G02B 27/0178;
(Continued)

(56) References Cited

U.S. PATENT DOCUMENTS 8,310,746 B2 11/2012 Kim et al.
8,934,160 B2 1/2015 Sun
(Continued)

FOREIGN PATENT DOCUMENTS

| JP | 2003015192 A | * | 1/2003 |
| JP | 2009157026 A | | 7/2009 |
| KR | 10-1539668 B1 | | 8/2015 |

OTHER PUBLICATIONS

Seong-Bok Kim et al. "Optical see-through Maxwellian near-to-eye display with an enlarged eyebox" Optics Letters, vol. 43, No. 4, Feb. 15, 2018 (pp. 767-770).

*Primary Examiner* — Ephrem Z Mebrahtu
(74) *Attorney, Agent, or Firm* — Sughrue Mion, PLLC (57) ABSTRACT

Provided is an image display device including a first light source configured to emit a first beam of light, a second light source configured to emit a second beam of light, a spatial light modulator configured to modulate the first beam of light and the second beam of light, a holographic optical element configured to focus, on a first focal point, the first beam of light emitted from the first light source and modulated by the spatial light modulator, and to focus, on a second focal point, the second beam of light emitted from the second light source and modulated by the spatial light modulator and a processor configured to control the first and the second light sources and the spatial light modulator.

17 Claims, 7 Drawing Sheets

(58) Field of Classification Search
CPC .... G02F 2203/12; G03H 1/2294; G03H 1/28; G03H 2001/0439; G03H 1/12; G03H 1/2205; G03H 1/04
See application file for complete search history.

(56) References Cited

U.S. PATENT DOCUMENTS

| | | | |
|---|---|---|---|
| 2014/0226193 A1* | 8/2014 | Sun .................... | G02B 27/0172 359/19 |
| 2014/0232651 A1* | 8/2014 | Kress .................... | G06F 3/013 345/158 |
| 2016/0147081 A1* | 5/2016 | Kilcher .................. | G02B 7/08 359/13 |
| 2017/0003650 A1* | 1/2017 | Moser .................... | G03H 1/041 |
| 2017/0102541 A1 | 4/2017 | Tremblay et al. | |
| 2017/0176752 A1* | 6/2017 | Vieira ................ | G02B 27/0172 |
| 2018/0129165 A1* | 5/2018 | Lee ...................... | G03H 1/0406 |
| 2018/0188688 A1* | 7/2018 | Maimone ............ | G03H 1/2205 |
| 2019/0049899 A1* | 2/2019 | Gelman ................ | G03H 1/2249 |
| 2019/0121133 A1* | 4/2019 | Pierer .................. | G02B 26/101 |
| 2019/0179152 A1* | 6/2019 | Vieira ................ | G02B 27/0172 |
| 2020/0341277 A1* | 10/2020 | McGrew ................ | G09G 5/00 |

* cited by examiner

IMAGE DISPLAY DEVICE AND METHOD OF DISPLAYING IMAGE USING MULTIPLEX HOLOGRAPHIC OPTICAL ELEMENT

CROSS-REFERENCE TO RELATED APPLICATION

This application claims priority from Korean Patent Application No. 10-2018-0106045, filed on Sep. 5, 2018, in the Korean Intellectual Property Office, the disclosure of which is incorporated herein in its entirety by reference.

BACKGROUND

1. Field

The present disclosure relates to image display devices using a multiplex holographic optical element, and image display methods using the same.

2. Description of the Related Art

Recently, the demand for Augmented Reality (AR) glasses has increased. AR glasses are apparatuses that enable visual recognition of a desired image while simultaneously viewing external scenery.

AR glasses require a combiner that enables a viewer to simultaneously view an image generated by a particular signal and external scenery. The combiner may include a beam splitter (BS) or a holographic optical element (HOE).

Generally, an optical system including a BS, a lens, and a mirror is used as the combiner. However, when this type of combiner is used, the volumes of the BS and the optical system may be increased according to an increase in viewing angle.

Recently, studies have been conducted on a holographic optical element capable of realizing complicated optical characteristics in a simple form.

A combiner that uses a holographic optical element is manufactured to perform a function of a concave mirror, and thus, allows an image to be viewed by forming a focal point at the level of pupils of eyes. However, when the holographic optical element is used as a combiner, eyes must be correctly located on a focal point of a very small size to view a correct image, and thus, an eye box which is a viewing range of an image may be greatly reduced.

SUMMARY

Provided are methods of enlarging a viewing range of an image display device.

Provided are methods of providing identical images within the viewing range of the image display device.

Additional aspects will be set forth in part in the description which follows and, in part, will be apparent from the description, or may be learned by practice of the embodiments of the disclosure.

According to an aspect of the disclosure, there is provided an image display device comprising: a first light source configured to emit a first beam of light; a second light source configured to emit a second beam of light; a spatial light modulator configured to modulate the first beam of light and the second beam of light; a holographic optical element configured to focus, on a first focal point, the first beam of light emitted from the first light source and modulated by the spatial light modulator, and to focus, on a second focal point, the second beam of light emitted from the second light source and modulated by the spatial light modulator; and a processor configured to control the first and the second light sources and the spatial light modulator.

The holographic optical element may comprise a first interference pattern based on the first beam of light and a second interference pattern based on the second beam of light.

The first interference pattern maybe formed by a first reference beam and a first signal beam, wherein the first reference beam is incident to a photosensitive film and converges to a first convergence point, and the first signal beam is dispersed from a first dispersing point and is incident to the photosensitive film, and the second interference pattern maybe formed by a second reference beam and a second signal beam, wherein the second reference beam is incident to the photosensitive film and converges to a second convergence point, and the second signal beam is dispersed from a second dispersing point and is incident to the photosensitive film.

The first reference beam and the first signal beam may have identical amplitude, phase, and wavelength spectrums, and the second reference beam and the second signal beam have may identical amplitude, phase, and wavelength spectrums.

The first light source and the second light source maybe are arranged such that a first travelling path of the first beam of light incident to the holographic optical element is opposite of a second travelling path of the first reference beam, and a third travelling path of the second beam of light incident to the holographic optical element is opposite of a fourth travelling path of the second reference beam.

Amplitude, phase, and wavelength spectrums of the first beam of light maybe same as amplitude, phase, and wavelength spectrums of the first reference beam, and amplitude, phase, and wavelength spectrums of the second beam of light maybe same as amplitude, phase, and wavelength spectrums of the second reference beam.

The image display device may further comprise a lens configured to cause the first beam of light and the second beam of light modulated by the spatial light modulator to be incident to the holographic optical element.

The spatial light modulator may differently modulate the first beam of light and the second beam of light.

A first image focused on the first focal point and a second image focused on the second focal point maybe identical to each other.

The processor may sequentially drive the first light source and the second light source.

The processor may control the spatial light modulator to sequentially modulate the first beam of light and the second beam of light, in synchronization with driving times of the first light source and the second light source.

The image display device may further comprise a sensor configured to detect a location of a pupil of a user.

The processor may control the first light source and the second light source and the spatial light modulator based on information about the detected location of a pupil from the sensor.

The processor may drive only the first light source when the pupil is located on the first focal point, and drives only the second light source when the pupil is located on the second focal point.

The first light source and the second light source may comprise laser diodes.

The image display device maybe a wearable device.

According to another aspect of the disclosure, there is provided a method of displaying an image, comprising: sequentially emitting a first beam of light and a second beam of light; sequentially modulating the first beam of light and the second beam of light based on an order in which the first beam of light and the second beam of light are emitted; focusing, on a first focal point, the modulated first beam of light, and focusing, on a second focal point, the modulated second beam of light, the first focal point being different from the second focal point.

The focusing of the modulated first beam of light and the focusing of the modulated second beam of light may use a multiplex holographic optical element.

The modulating of the first beam of light and the second beam of light may comprise differently modulating the first beam of light and the second beam of light.

The focusing of the modulated first beam of light and the focusing of the modulated second beam of light may comprise focusing the modulated first beam of light and the modulated second beam of light to generate a first image on the first focal point and a second image on the second focal point, and wherein the first image on the first focal point is identical to the second image on the second focal point.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, image display devices using a multiplex holographic optical element will now be described with reference to the accompanying drawings. In the drawings, like reference numerals refer to like elements throughout, and sizes and thicknesses of constituent elements may be exaggerated for the clarity of the specification.

It will be understood that, although the terms "first", "second", etc. may be used herein to describe various elements, these elements should not be limited by these terms. These terms are only used to distinguish one element from another. The image display devices using a multiplex holographic optical element and the image display methods may be realized in various different ways, and the descriptions of embodiments are not limited thereto.

It should be understood that, when a part "comprises" or "includes" an element in the specification, unless otherwise defined, it is not excluding other elements but may further include other elements.

Figure 1:
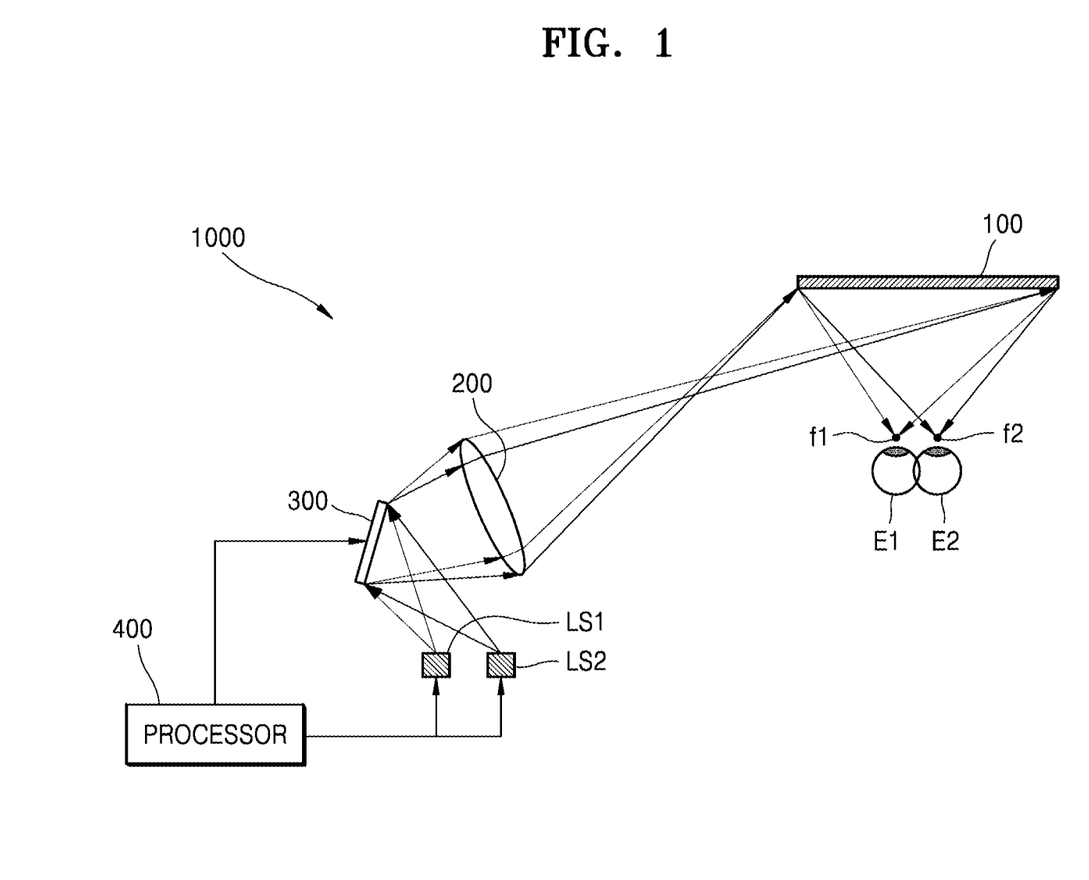
FIG. 1 is a simplified lateral cross-sectional view of an image display device according to an embodiment.
Figure 2:
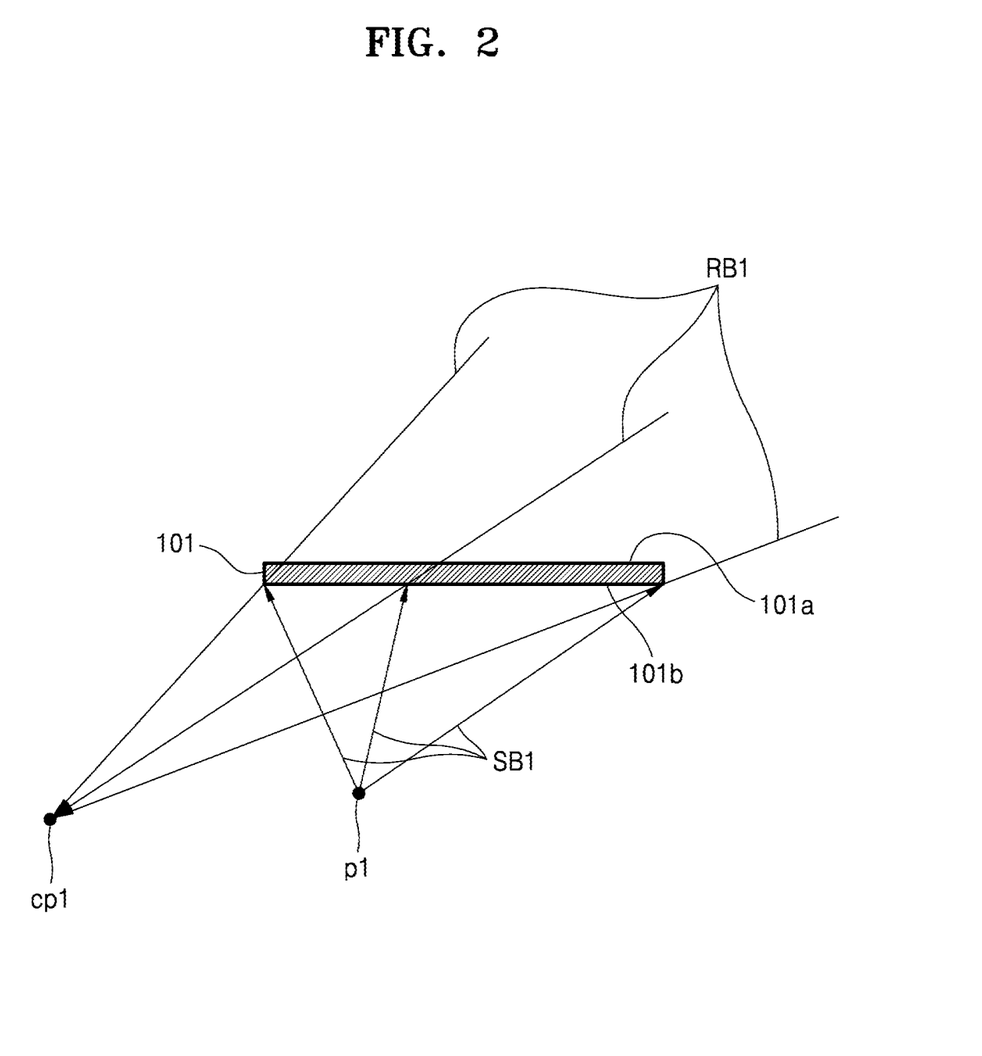
FIG. 2 is a simplified lateral cross-sectional view illustrating a method of forming a first interference pattern including a holographic optical element included in the image display device of FIG. 1, according to an embodiment.
Figure 3:
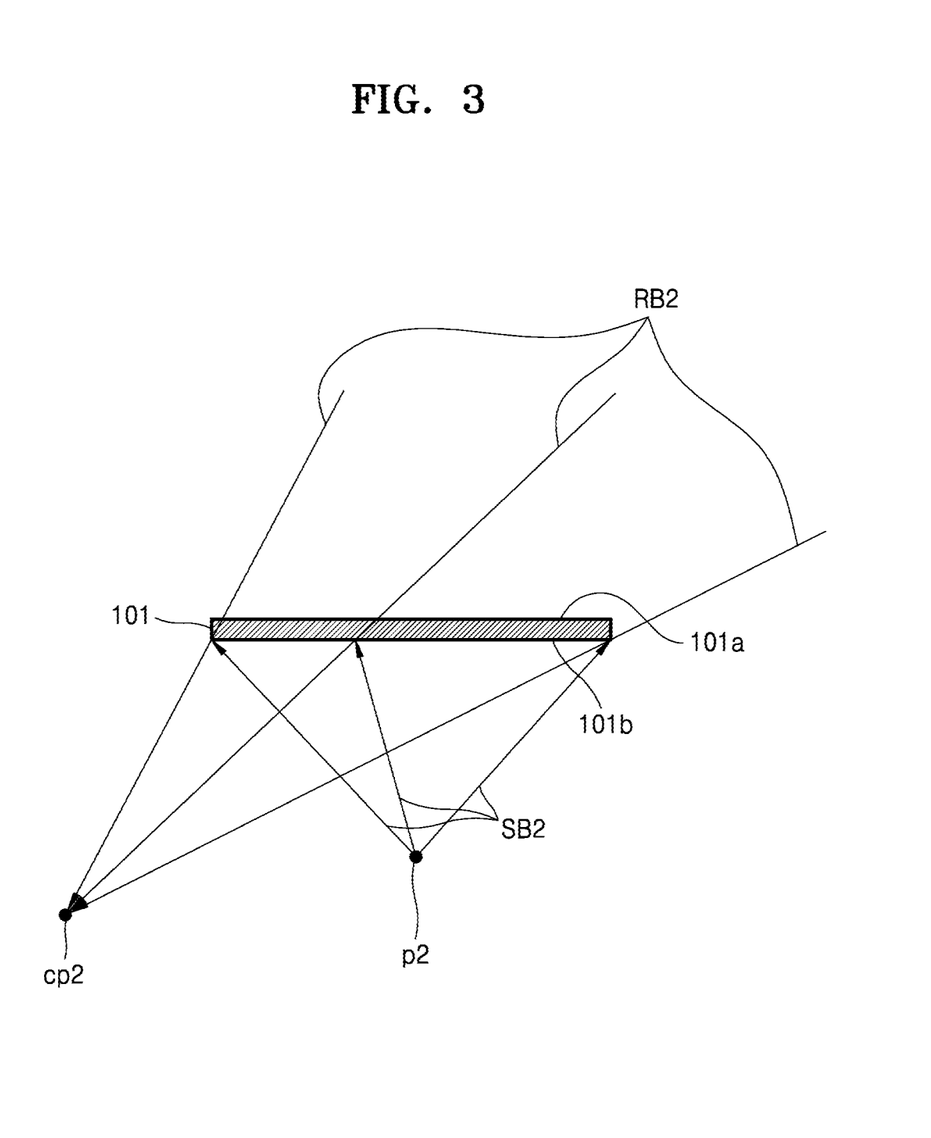
FIG. 3 is a simplified lateral cross-sectional view illustrating a method of forming a second interference pattern including a holographic optical element included in the image display device of FIG. 1, according to an embodiment.

FIG. 1 is a simplified lateral cross-sectional view of an image display device 1000 according to an embodiment. FIG. 2 is a simplified lateral cross-sectional view illustrating a method of forming a first interference pattern using a holographic optical element 100 included in the image display device 1000 of FIG. 1 according to an embodiment. FIG. 3 is a simplified lateral cross-sectional view illustrating a method of forming a second interference pattern using the holographic optical element 100 included in the image display device 1000 of FIG. 1 according to an embodiment.

Referring to FIG. 1, the image display device 1000 may include a plurality of light sources including a first light source LS1 and a second light source LS2, a spatial light modulator 300 configured to modulate a beam entering from the plurality of light sources, i.e., LS1 and LS2, the holographic optical element 100 configured to focus a beam that is emitted from the first light source LS1 and is modulated by the spatial light modulator 300 to a first focal point f1 and configured to focus a beam that is emitted from the second light source LS2 and is modulated by the spatial light modulator 300 to a second focal point f2 which is different from the first focal point f1, a processor 400 configured to control the plurality of light sources and the spatial light modulator 300. The image display device 1000 may further include a lens 200 that allows a beam modulated by the spatial light modulator 300 to enter the holographic optical element 100. According to an embodiment, the lens 200 may focus the beam modulated by the spatial light modulator 300 towards the holographic optical element 100.

In FIG. 1, only two light sources (the first light source LS1 and the second light source LS2) are depicted, but the embodiment is not limited thereto. For instance, the image display device 1000 may include more than three light sources. Hereinafter, for the clarity of explanation, the first light source LS1 and the second light source LS2 will be described as an example. The first light source LS1 and the second light source LS2 may include laser diodes that emit laser beams. The beam emitted from the first light source LS1 and the second light source LS2 may have a coherency. Also, the first light source LS1 and the second light source LS2 may emit a laser beam in which beams having different wavelengths are overlapped. An amplitude, a phase, and a wavelength spectrum of a beam emitted from the first light source LS1 may be different from those of a beam emitted from the second light source LS2. Locations where the first light source LS1 and the second light source LS2 are disposed may be different from each other. In this manner, beams emitted from the first light source LS1 and the second light source LS2 that are located in different locations as described below may enter the holographic optical element 100 with different incident angles, and afterwards, may be respectively focused on the first focal point f1 and the second focal point f2.

The spatial light modulator 300 may include an optical electrical device that may change a refractive index by, for example, an electrical signal. The spatial light modulator 300 may include, for example, a photoelectric material layer, such as a liquid crystal layer. The spatial light modulator 300 may control an amplitude, a phase, and a wavelength of emitted light by changing a refractive index when a voltage is applied to the photoelectric material layer.

The spatial light modulator 300 may receive an image signal from the processor 400 and may modulate at least one of the amplitude, the phase, and the wavelength of a beam incident from the plurality of light sources based on the received image signal. Also, the spatial light modulator 300 may modulate an amplitude, a phase, and a wavelength of a beam emitted from the first light source LS1 differently from those of a beam emitted from the second light source LS2. Accordingly, beams emitted from the first light source LS1 and the second light source LS2 respectively may include different images.

The lens 200 may be a convex lens that allows a beam modulated by the spatial light modulator 300 to enter the holographic optical element 100. However, the embodiment is not limited thereto, that is, the lens 200 may include all kind of lenses to allow the modulated beam to enter the holographic optical element 100.

The holographic optical element 100 may be a multiplex holographic optical element 100 including a first interference pattern displayed by a beam of the first light source LS1 and a second interference pattern displayed by a beam of the second light source LS2. Hereinafter, a method of forming the first and second interference patterns will be described with reference to FIGS. 2 and 3.

Referring to FIG. 2, the first interference pattern may be formed by an interference of a first reference beam RB1 that enters a photosensitive film 101 to converge to a first convergence point cp1 and a first signal beam SB1 that is dispersed from a first point p1 and is incident to the photosensitive film 101.

For example, the first interference pattern may be formed by an interference of the first reference beam RB1 incident to a first surface 101*a* of the photosensitive film 101 and the first signal beam SB1 incident to a second surface 101*b* opposite to the first surface 101*a*. The first reference beam RB1 and the first signal beam SB1 may have the same amplitude, phase, and wavelength spectrum.

Referring to FIG. 3, the second interference pattern may be formed by an interference of a second reference beam RB2 that enters the photosensitive film 101 to converge to a second convergence point cp2 and a second signal beam SB2 that is dispersed from a second point p2 and is incident to the photosensitive film 101.

For example, the second interference pattern may be formed by an interference of the second reference beam RB2 incident to the first surface 101*a* of the photosensitive film 101 on which the first interference pattern is formed and the second signal beam SB2 incident to the second surface 101*b*. The second reference beam RB2 and the second signal beam SB2 may have the same amplitude, phase, and wavelength spectrum.

In this way, the multiplex holographic optical element 100 may form an image by forming the first interference pattern and the second interference pattern on the photosensitive film 101. At this point, an incident angle of the first reference beam RB1 may be different from that of the second reference beam RB2. In this way, the first and second interference patterns are formed by the first reference beam RB1 and the second reference beam RB2 having different incident angles from each other, and thus, the holographic optical element 100 may have an angle selectivity with respect to an incident beam. For example, a beam emitted from the first light source LS1 may pass through the first convergence point cp1 by the spatial light modulator 300 and the lens 200 and may enter the holographic optical element 100 by travelling as the same direction as the first reference beam RB1. In this way, the beam emitted from the first light source LS1 and entered the holographic optical element 100 through the first convergence point cp1 may be focused on the first point p1 by travelling as the same travelling direction as the first signal beam SB1 that causes an interference with the first reference beam RB1. In this case, the beam emitted from the first light source LS1 may include the same amplitude, phase, and wavelength spectrum as those of the first reference beam RB1. Here, the first point p1 may be the same point as the first focal point f1. Also, for example, a beam emitted from the second light source LS2 may pass through the second convergence point cp2 by the spatial light modulator 300 and the lens 200 and may enter the holographic optical element 100 by travelling as the same direction as the second reference beam RB2. In this way, the beam emitted from the second light source LS2 and entered the holographic optical element 100 through the second convergence point cp2 may be focused on the second point p2 by travelling as the same travelling direction as the second signal beam SB2 that causes an interference with the second reference beam RB2. In this case, the beam emitted from the second light source LS2 may include the same amplitude, phase, and wavelength spectrum as those of the second reference beam RB2. Here, the second point p2 may be the same point as the second focal point f2.

Referring to FIG. 1, the first light source LS1 may be disposed so that a beam that is emitted from the first light source LS1 and enters the holographic optical element 100 through the spatial light modulator 300 and the lens 200 has an incident travelling path that is opposite of the travelling path of the first reference beam RB1. Also, the second light source LS2 may be disposed so that a beam that is emitted from the second light source LS2 and enters the holographic optical element 100 through the spatial light modulator 300 and the lens 200 has an incident travelling path that is opposite of the travelling path of the second reference beam RB2.

As described above, the holographic optical element 100 has an angle selectivity with respect to a beam entering the holographic optical element 100, and thus, when beams emitted from the first light source LS1 and the second light source LS2 enter the holographic optical element 100 with different incident angles from each other, beams emitted from the holographic optical element 100 may travel in different paths from each other, and respectively may be focused on the first focal point f1 and the second focal point f2.

As described above, a beam emitted from the first light source LS1 and a beam emitted from the second light source LS2 may be differently modulated by the spatial light modulator 300. In this case, the two beams may include different images. However, an image focused on the first focal point f1 and an image focused on the second focal point f2 by the holographic optical element 100 may be identical to each other. In this way, beams that are emitted from the first light source LS1 and the second light source LS2 and are respectively differently modulated show an identical image by respectively focusing on the first focal point f1 and the second focal point f2. This is because the different images become identical by an optical path difference generated in a process of focusing. Accordingly, images focused on a first pupil E1 and a second pupil E2 may be identical.

In the same manner as described above, the image display device 1000 may display identical images on a plurality of focal points f1 and f2. In FIGS. 1 through 4, two light sources and two types of interference patterns are depicted, but the present embodiment is not limited thereto, that is, the image display device 1000 may further include more than two light sources and more than two types of interference patterns. In this case, the number of focal points on which the images is focused also increases, and as a result, an eye box may be expended.

The processor 400 may sequentially drive a plurality of light sources. For example, the processor 400 may sequentially drive the first light source LS1 and the second light source LS2 of a plurality of light sources. At this point, while the processor 400 drives one light source, the processor 400 may not drive the rest of light sources. A minimum value of a driving frequency of a light source of the processor 400 may be 40 Hz.

The processor 400 may control the spatial light modulator 300 to sequentially modulate beams emitted from the first light source LS1 and the second light source LS2, in synchronization with driving times of a plurality of light sources. The processor 400 may control the spatial light modulator 300 such that a beam emitted from the first light source LS1 and a beam emitted from the second light source LS2 are differently modulated.

Figure 4:
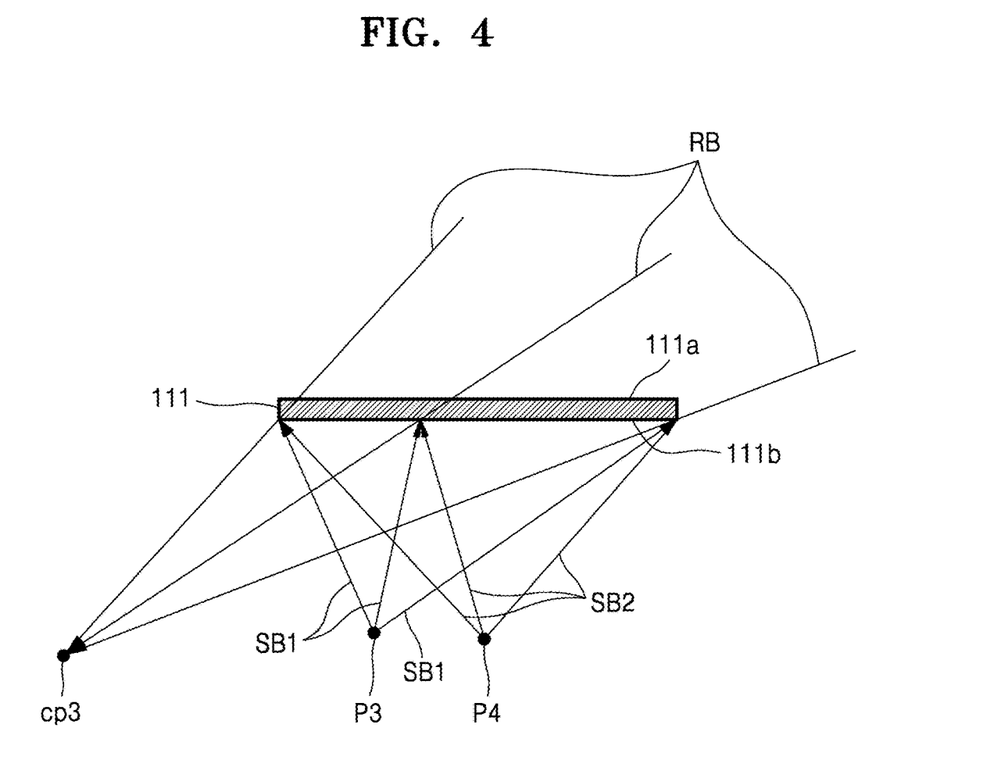
FIG. 4 is a simplified lateral cross-sectional view illustrating a method of forming a holographic optical element according to a comparative example.
Figure 5:
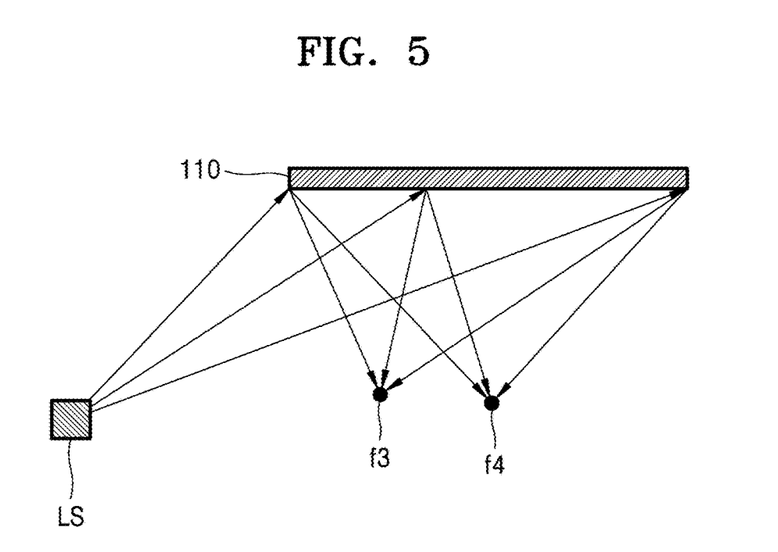
FIG. 5 is a simplified lateral cross-sectional view illustrating a method by which a holographic optical element according to a comparative example displays an image.
Figure 6:
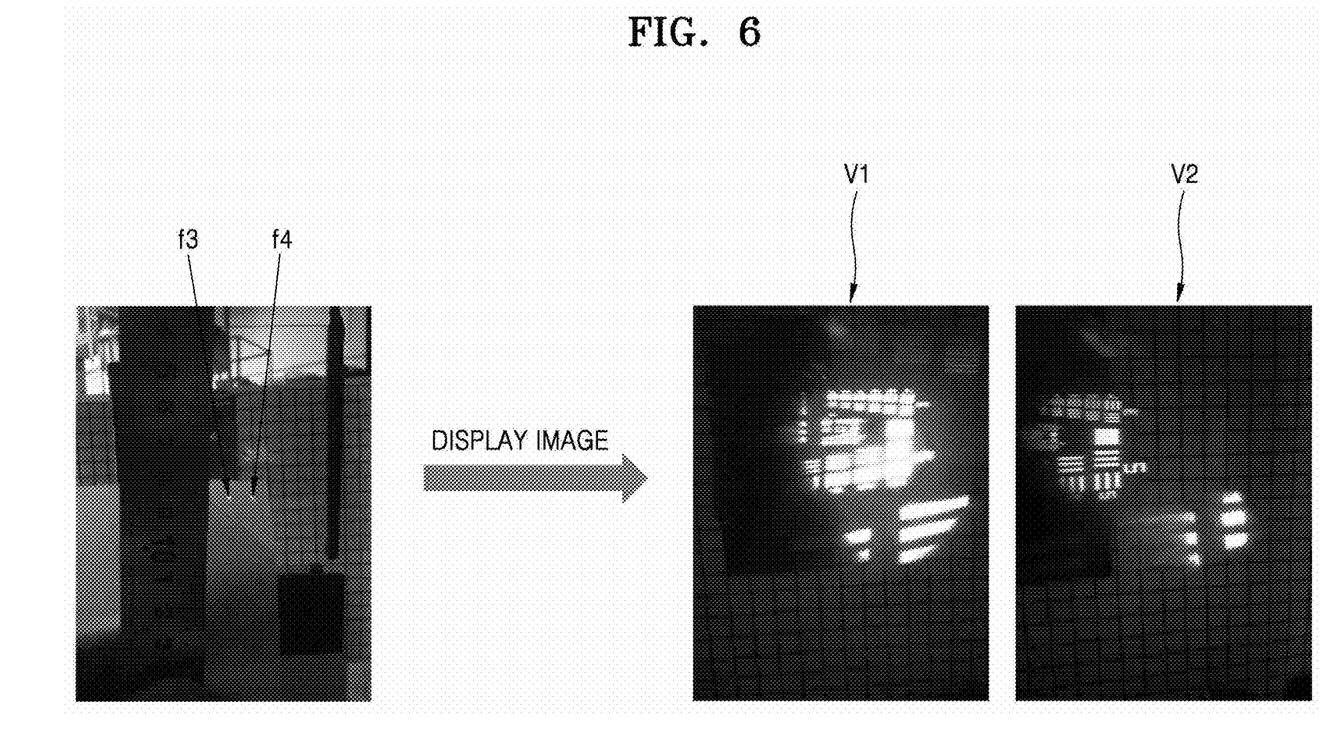
FIG. 6 shows photos simply showing images displayed by a holographic optical element according to a comparative example.

FIG. 4 is a simplified lateral cross-sectional view illustrating a method of forming an image by the holographic optical element 110 according to a comparative example. FIG. 5 is a simplified lateral cross-sectional view illustrating a method of displaying an image by the holographic optical element 110 according to a comparative example. FIG. 6 is a simplified photos showing images displayed by the holographic optical element 110 according to a comparative example.

Referring to FIG. 4, a first interference pattern included in the holographic optical element 110 according to the comparative example may be formed by an interference of a reference beam RB incident to a first surface 111a of a photosensitive film 111 and a first signal beam SB1 incident to a second surface 111b opposite to the first surface 111a. Also, a second interference pattern may be formed by an interference of the reference beam RB incident to the first surface 111a of the photosensitive film 111 and a second signal beam SB2 incident to the second surface 111b facing the first surface 111a. In this case, the reference beam RB maybe incident to the first surface 111a so that extension lines of travelling paths of the reference beam RB is focused on a third convergence point cp3. Also, the first signal beam SB1 may be emitted from a third point p3 and may enter the second surface 111b, and the second signal beam SB2 may be emitted from a fourth point p4 which is different from the third point p3 and may enter the second surface 111b.

Referring to FIG. 5, when a beam emitted from a light source LS and modulated by a spatial light modulator (not shown) enters the holographic optical element 110 through a lens (not shown), the beam may be focused on a third focal point f3 and a fourth focal point f4. The third focal point f3 and the fourth focal point f4 respectively may be points identical to the third point p3 and the fourth point p4. In FIG. 5, the spatial light modulator and the lens are omitted for convenience of explanation.

In this case, when a beam that is emitted from the light source LS and is modulated by a spatial light modulator is focused on two focal points f3 and f4, images formed on the two focal points f3 and f4 may be different from each other by an optical path difference generated in a process of focusing on the two focal points f3 and f4. For example, referring to FIG. 6, when the holographic optical element 110 is used, a first image V1 formed on the third focal point f3 and a second image V2 formed on the fourth focal point f4 may be different from each other.

Figure 7:
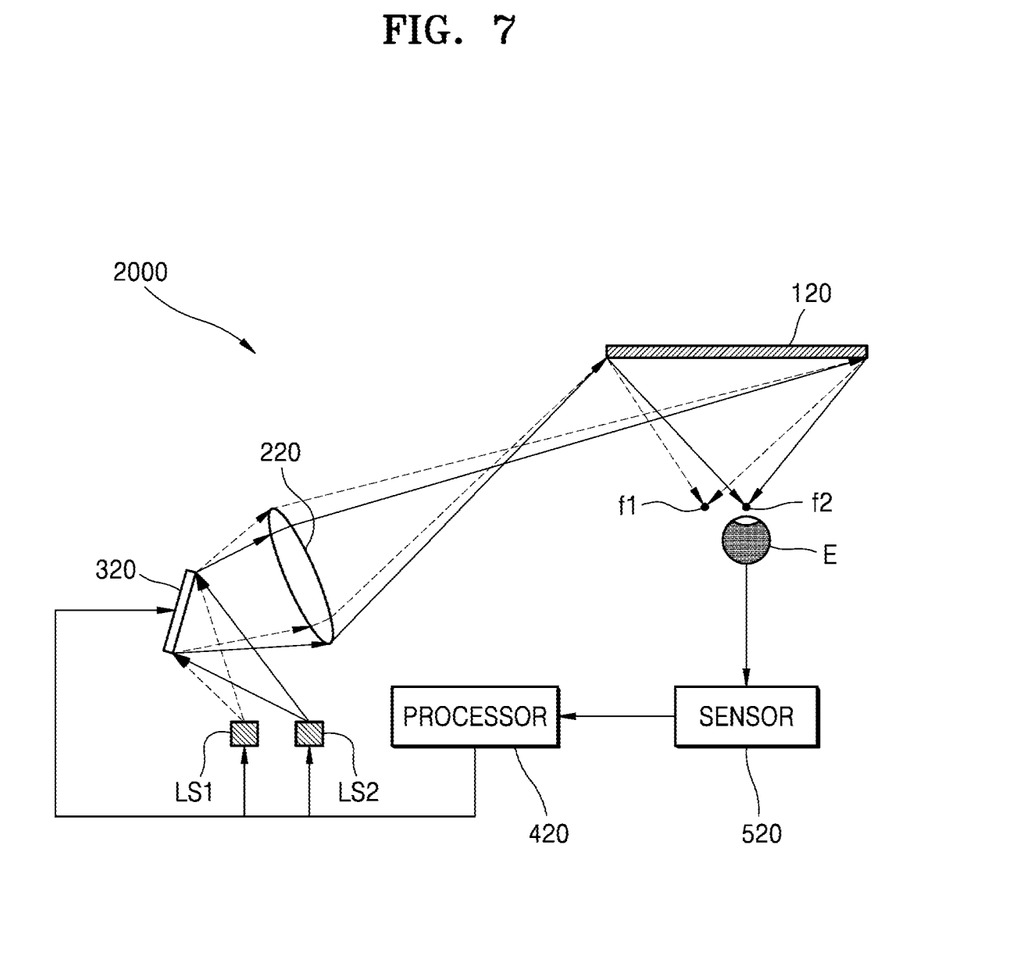
FIG. 7 is a simplified lateral cross-sectional view of an image display device according to another embodiment.

FIG. 7 is a simplified lateral cross-sectional view of an image display device 2000 according to another embodiment. In describing the image display device 2000 with reference to FIG. 7, repeated descriptions of elements provided with reference to FIG. 1 will be omitted.

Referring to FIG. 7, the image display device 2000 may further include a sensor 520 configured to detect a location of a pupil E of a user. A processor 420 may control the first light source LS1, the second light source LS2, and a spatial light modulator 320 according to information about the location of a pupil detected by the sensor 520.

For example, the sensor 520 may detect information about a location of a pupil E of a user and may transmit the information to the processor 420. The processor 420 may drive the first light source LS1 or the second light source LS2 based on the information. For example, when the pupil E of the user is located on the first focal point f1, the processor 420 may drive only the first light source LS1. In this case, a beam emitted from the first light source LS1 may be focused on the first focal point f1 by a holographic optical element 120. Also, when the pupil E of the user is located on the second focal point f2, the processor 420 may drive only the second light source LS2. In this case, a beam emitted from the second light source LS2 may be focused on the second focal point f2 by the holographic optical element 120. In FIG. 7, two light sources are depicted, but the present embodiment is not limited thereto, that is, the image display device 2000 may include three light sources or more. In this case, the processor 420 may selectively drive the plurality of light sources of more than three corresponding to a case when the pupils E of the user are located on a plurality of focal points. In this manner, the processor 420 may selectively drive light sources that emit beams focused on the locations of pupils E based on information about the locations of pupils E of the user obtained from the sensor 520.

Also, the processor 420 may control the spatial light modulator 320 to modulate beams emitted from the light sources in synchronization with a driving time of each of the light sources. For example, when the processor 420 drives the first light source LS1 since the pupil E of the user is located on the first focal point f1, the processor 420 may control the spatial light modulator 320 to modulate a beam emitted from the first light source LS1. Also, when the processor 420 drives the second light source LS2 since the pupil E of the user is located on the second focal point f2, the processor 420 may control the spatial light modulator 320 so as to modulate a beam emitted from the second light source LS2 differently from the beam emitted from the first light source LS1.

The image display devices 1000 and 2000 using the multiplex holographic optical elements 100 and 120 described with reference to FIGS. 1 through 7 may be wearable devices. For example, the image display devices 1000 and 2000 may be Augmented Reality (AR) Glasses. When the user uses the image display devices 1000 and 2000 as the AR glasses, light emitted from an object and a scenery and transmitting through the holographic optical elements 100 and 120 and a beam emitted from the first and second light sources and modulated are focused on a pupil of a user, and thus, the user may view an AR image in which an image of the real world and a virtual reality image of the world are combined.

Figure 8:
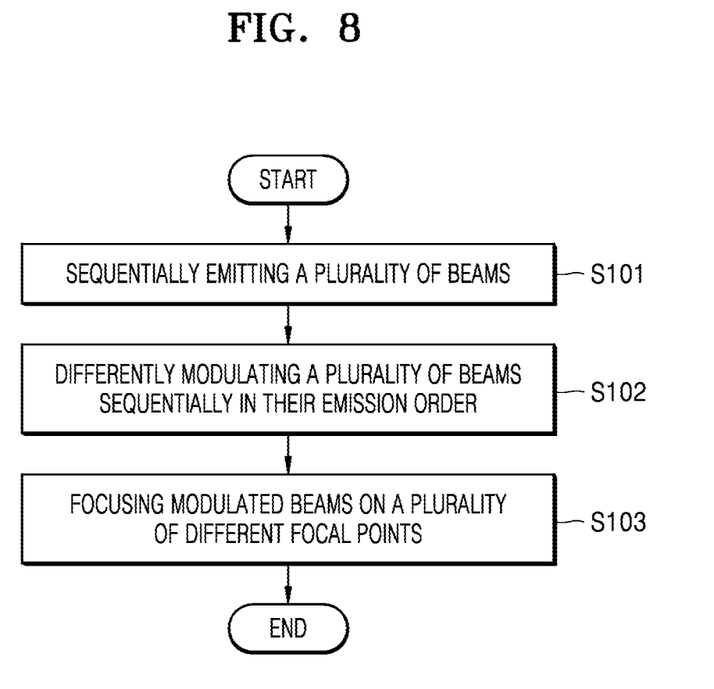
FIG. 8 is a flow chart showing a method of displaying identical images on a plurality of focal points included in an eye box, according to an embodiment.

FIG. 8 is a flow chart showing a method of displaying identical images on a plurality of focal points included in an eye box according to an embodiment.

Referring to FIG. 8, the method of displaying an image may include an operation of emitting a beam (S101), an operation of modulating a beam (S102), and an operation of focusing the beam (S103).

In the operation of emitting a beam (S101), a plurality of beams may be sequentially emitted. In this case, the beams respectively may include amplitudes, phases, and wavelength spectrums different from each other. The plurality of beams may be laser beams having coherency. Also, points where the plurality of beams are emitted may be different from each other. Accordingly, travelling paths of the plurality of beams may be different from each other.

In the operation of modulating a beam (S102), the plurality of beams may be differently modulated sequentially in the emitted order. For example, at least one of a plurality of amplitudes, phases, and wavelength spectrums may be differently modulated. The plurality of beams respectively may include different images.

In the operation of focusing a beam (S103), the modulated beams may be focused on a plurality of focal points. In the focusing operation (S103), the multiplex holographic optical element 100 described with reference to FIGS. 1 through 3 may be used. The plurality of beams differently modulated in the operation of modulating a beam (S102) may be focused on the plurality of focal points by the holographic optical element 100. In this case, images focused on a plurality of focal points by the holographic optical element 100 may be identical to each other.

The embodiments according to the present disclosure may provide an image display device in which an eye box including a plurality of identical images is expanded by using a multiplex holographic optical element.

While image display devices using a multiplex holographic optical element and methods of displaying images have been described with reference to the embodiments depicted in the drawings to facilitate the understanding of the whole specification, it will be understood by those of ordinary skill in the art that various changes in form and details may be made therein without departing from the spirit and scope of the disclosure. Accordingly, the scope of the disclosure of the image display device using a multiplex holographic optical element and the method of displaying images are defined not by the detailed description of the disclosure but by the appended claims.

What is claimed is:

1. An image display device comprising:
a first light source configured to emit a first beam of light;
a second light source configured to emit a second beam of light;
a spatial light modulator configured to modulate the first beam of light and the second beam of light;
a holographic optical element configured to focus, on a first focal point, the first beam of light emitted from the first light source and modulated by the spatial light modulator, and to focus, on a second focal point, the second beam of light emitted from the second light source and modulated by the spatial light modulator; and
a processor configured to control the first and the second light sources and the spatial light modulator,
wherein the spatial light modulator differently modulates the first beam of light and the second beam of light such that the first beam of light and the second beam of light include different images, and
wherein a first image of the first beam of light emitted from the first light source, modulated by the spatial light modulator, and focused on the first focal point and a second image of the second beam of light emitted from the second light source, modulated by the spatial light modulator, and focused on the second focal point become to be identical to each other.

2. The image display device of claim 1, wherein the holographic optical element comprises a first interference pattern corresponding to the first beam of light and a second interference pattern corresponding to the second beam of light.

3. The image display device of claim 2, wherein
the first interference pattern is formed by a first reference beam and a first signal beam, wherein the first reference beam is incident to a photosensitive film and converges to a first convergence point, and the first signal beam is dispersed from a first dispersing point and is incident to the photosensitive film, and
the second interference pattern is formed by a second reference beam and a second signal beam, wherein the second reference beam is incident to the photosensitive film and converges to a second convergence point, and the second signal beam is dispersed from a second dispersing point and is incident to the photosensitive film.

4. The image display device of claim 3, wherein the first reference beam and the first signal beam have identical amplitude, phase, and wavelength spectrums, and the second reference beam and the second signal beam have identical amplitude, phase, and wavelength spectrums.

5. The image display device of claim 3, wherein the first light source and the second light source are arranged such that a first travelling path of the first beam of light incident to the holographic optical element is parallel to a second travelling path of the first reference beam, and a third travelling path of the second beam of light incident to the holographic optical element is parallel to a fourth travelling path of the second reference beam.

6. The image display device of claim 3, wherein amplitude, phase, and wavelength spectrums of the first beam of light are same as amplitude, phase, and wavelength spectrums of the first reference beam, and amplitude, phase, and wavelength spectrums of the second beam of light are same as amplitude, phase, and wavelength spectrums of the second reference beam.

7. The image display device of claim 1, further comprising a lens configured to cause the first beam of light and the second beam of light modulated by the spatial light modulator to be incident to the holographic optical element.

8. The image display device of claim 1, wherein the processor sequentially drives the first light source and the second light source.

9. The image display device of claim 8, wherein the processor controls the spatial light modulator to sequentially modulate the first beam of light and the second beam of light, in synchronization with driving times of the first light source and the second light source.

10. The image display device of claim 1, further comprising a sensor configured to detect a location of a pupil of a user.

11. The image display device of claim 10, wherein the processor controls the first light source and the second light source and the spatial light modulator based on information about the detected location of the pupil from the sensor.

12. The image display device of claim 11, wherein the processor drives only the first light source when the pupil is located on the first focal point, and drives only the second light source when the pupil is located on the second focal point.

13. The image display device of claim 1, wherein the first light source and the second light source comprise laser diodes.

14. The image display device of any one of claim 1, wherein the image display device is a wearable device.

15. The image display device of claim 1, wherein the holographic optical element comprises:
 a first interference pattern formed based on a first reference beam that converges to a first convergence point that coincides with the first beam of light, and
 a second interference pattern formed based on a second reference beam that converges to a second convergence point that coincides with the first beam of light,
 wherein the first convergence point and the second convergence point are different.

16. A method of displaying an image, comprising:
 sequentially emitting a first beam of light and a second beam of light;
 sequentially modulating the first beam of light and the second beam of light based on an order in which the first beam of light and the second beam of light are emitted such that the first beam of light and the second beam of light include different images;
 focusing, on a first focal point, the modulated first beam of light, and
 focusing, on a second focal point, the modulated second beam of light, the first focal point being different from the second focal point,
 wherein a first image of the first beam of light modulated and focused on the first focal point and a second image of the second beam of light modulated and focused on the second focal point become to be identical to each other.

17. The method of claim 16, wherein the focusing of the modulated first beam of light and the focusing of the modulated second beam of light uses a multiplex holographic optical element.

\* \* \* \* \*